(12) United States Patent
Ma et al.

(10) Patent No.: US 8,237,661 B2
(45) Date of Patent: Aug. 7, 2012

(54) KEYBOARD WITH MULTI-ANGLE POSITIONING SUPPORT

(75) Inventors: Xian-Wei Ma, Shenzhen (CN);
Feng-Xiang Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 241 days.

(21) Appl. No.: 12/781,832

(22) Filed: May 18, 2010

(65) Prior Publication Data
US 2011/0169740 A1    Jul. 14, 2011

(30) Foreign Application Priority Data
Jan. 8, 2010  (CN) .......................... 2010 1 0300125

(51) Int. Cl.
*G09F 3/02* (2006.01)
(52) U.S. Cl. ...................................... 345/168
(58) Field of Classification Search .......... 345/168–169; 248/688; 340/365; 400/682, 492; 341/21–23
See application file for complete search history.

(56) References Cited

U.S. PATENT DOCUMENTS

| | | | | | |
|---|---|---|---|---|---|
| 4,527,149 | A | * | 7/1985 | Swensen | 341/22 |
| 4,773,783 | A | * | 9/1988 | Dickie | 400/682 |
| 5,564,844 | A | * | 10/1996 | Patterson et al. | 400/492 |
| 5,732,928 | A | * | 3/1998 | Chang | 248/688 |
| 7,131,781 | B2 | * | 11/2006 | Tzeng et al. | 400/492 |
| 2002/0070922 | A1 | * | 6/2002 | Zarek | 345/168 |

FOREIGN PATENT DOCUMENTS

| | | |
|---|---|---|
| CN | 1497193 A | 5/2004 |
| CN | 1900879 A | 1/2007 |

* cited by examiner

*Primary Examiner* — Chanh Nguyen
*Assistant Examiner* — James Nokham
(74) *Attorney, Agent, or Firm* — Altis Law Group, Inc.

(57) ABSTRACT

A keyboard includes a main body and a support for adjusting the angle of the main body. The bottom of the main body defines slots, and furrows defined in opposite side walls of the slots. The support is accommodated in the main body, includes brackets received in the slots, two shafts, two driving portions, and two elastic pieces. The shafts slide relative to the main body. The driving portions are received in the shafts and are flexible relative to the shafts. One end of each elastic piece is fixed to the sidewall of each shaft, the other end resists one of the driving portions. When one of the shafts is moved, the shaft drives the elastic pieces to support the driving portions, one end of each driving portion is pushed out of the shaft to prop up the bracket.

8 Claims, 5 Drawing Sheets

KEYBOARD WITH MULTI-ANGLE POSITIONING SUPPORT

BACKGROUND

1. Technical Field

The present disclosure relates to keyboards and, particularly, to a keyboard with multi-angle positioning support.

2. Description of Related Art

Keyboard usually includes a main body and a pair of supports for lifting the main body to adjust the inclination of the main body. The supports are rotatably received in notches defined at the rear side of the bottom of the main body. Usually the supports are hidden in the back of the main body, therefore users must first locate the supports before using them. Furthermore, the supports have limited adjustment capabilities for one or two positions, which cannot completely meet various needs of all users.

Thus, what is needed is a keyboard with multi-angle positioning support.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
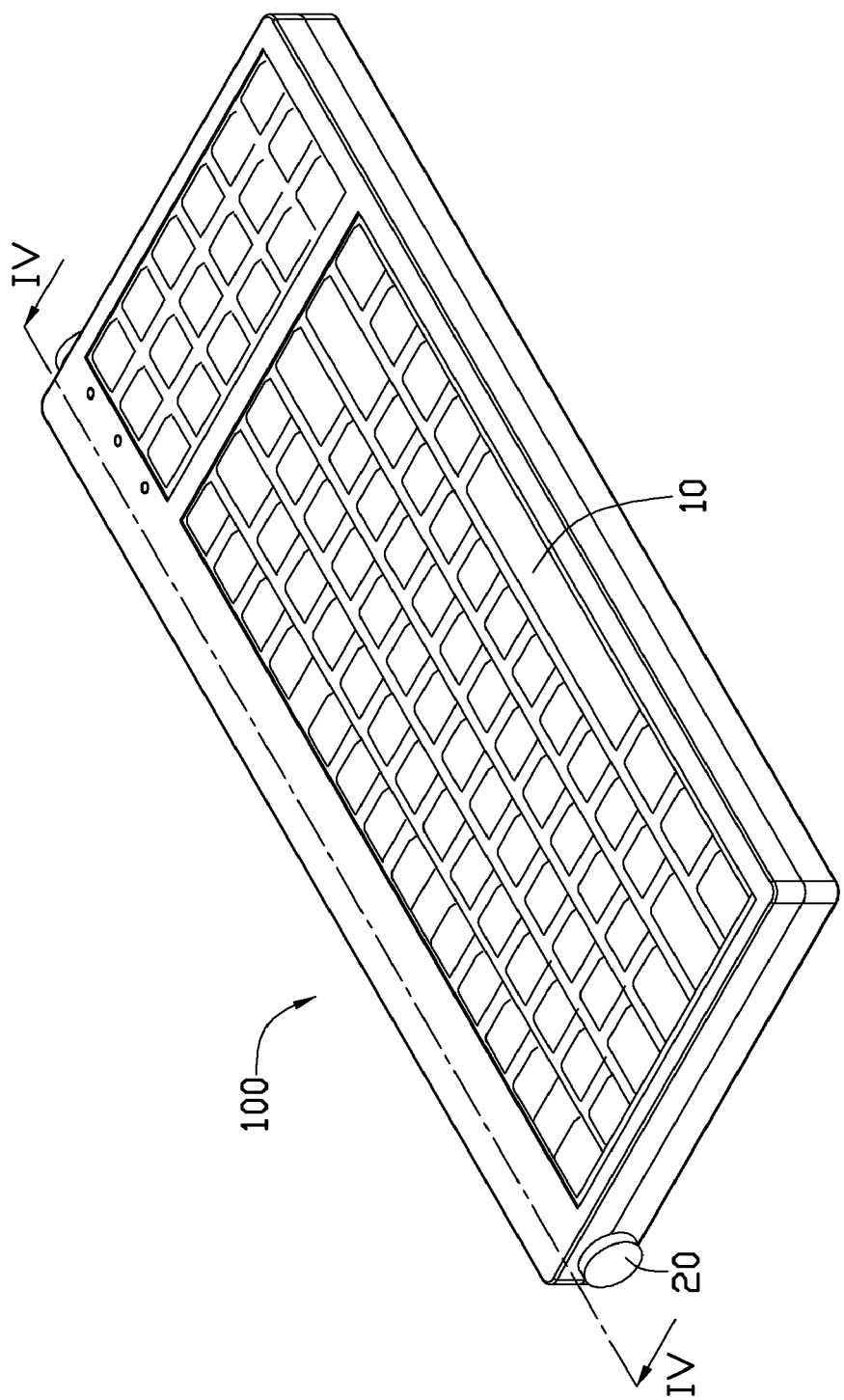
FIG. 1 is a schematic, isometric view of a keyboard with multi-angle positioning support according to an exemplary embodiment.

Referring to FIG. 1, a keyboard 100 with multi-angle positioning support 20 according to an exemplary embodiment is disclosed. The keyboard 100 includes a main body 10 configured for receiving keystrokes, and a support 20 accommodated in the main body 10 near the rear side of the main body 10. The support 20 is slidably mounted in the main body 10, and is able to be pulled out or pushed in for adjustment of the angular position of the keyboard 100.

Figure 2:
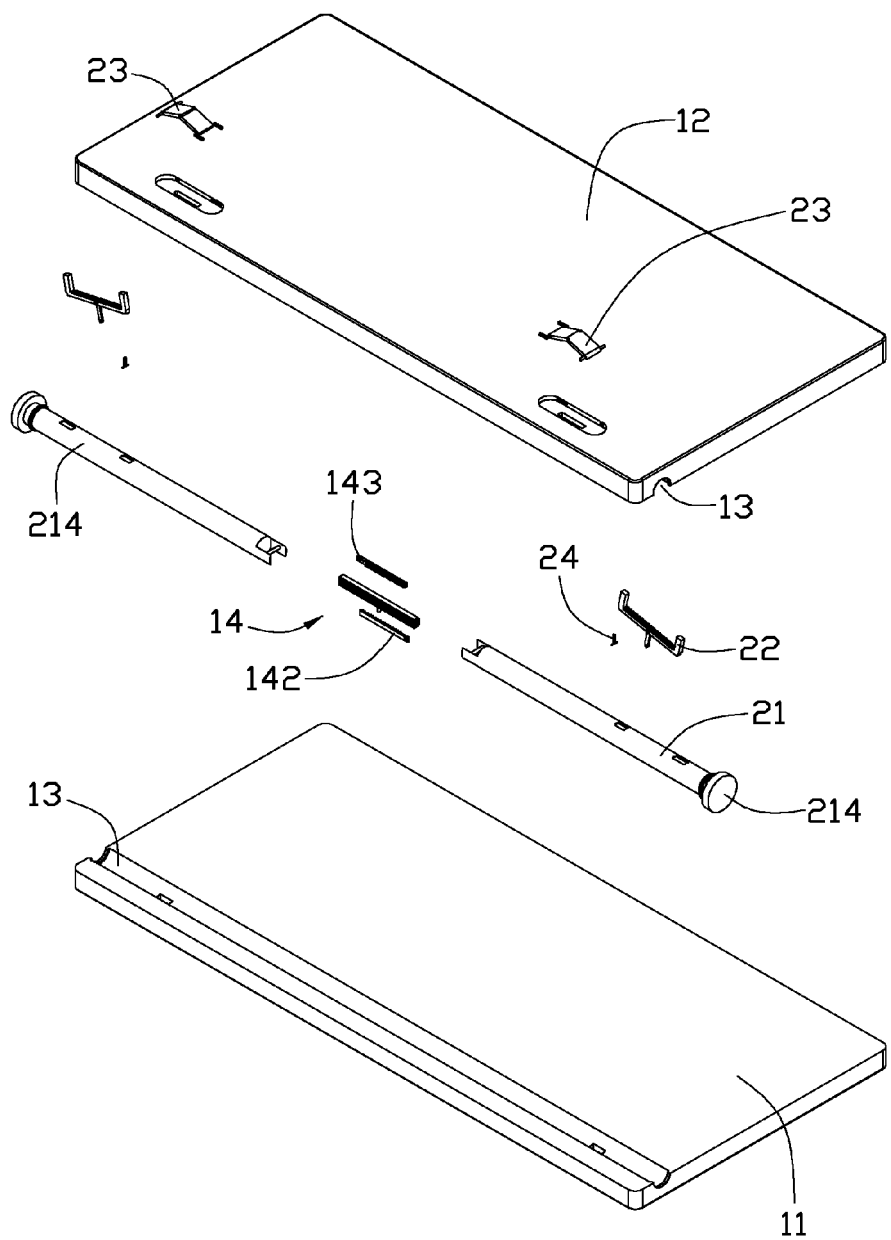
FIG. 2 is an exploded view of FIG. 1.

Referring to FIG. 2, the main body 10 includes an upper cover 11 and a lower cover 12 coupled with the upper cover 11, the upper cover 11 and the lower cover 12 cooperate to form a notch 13 at the rear side of the main body 10. In this embodiment, the notch 13 is columniform. The support 20 is received in the notch 13 with two ends extending out of the notch 13. Users can operate the two ends of the support 20 to adjust the angular position of the keyboard 100.

Figure 3:
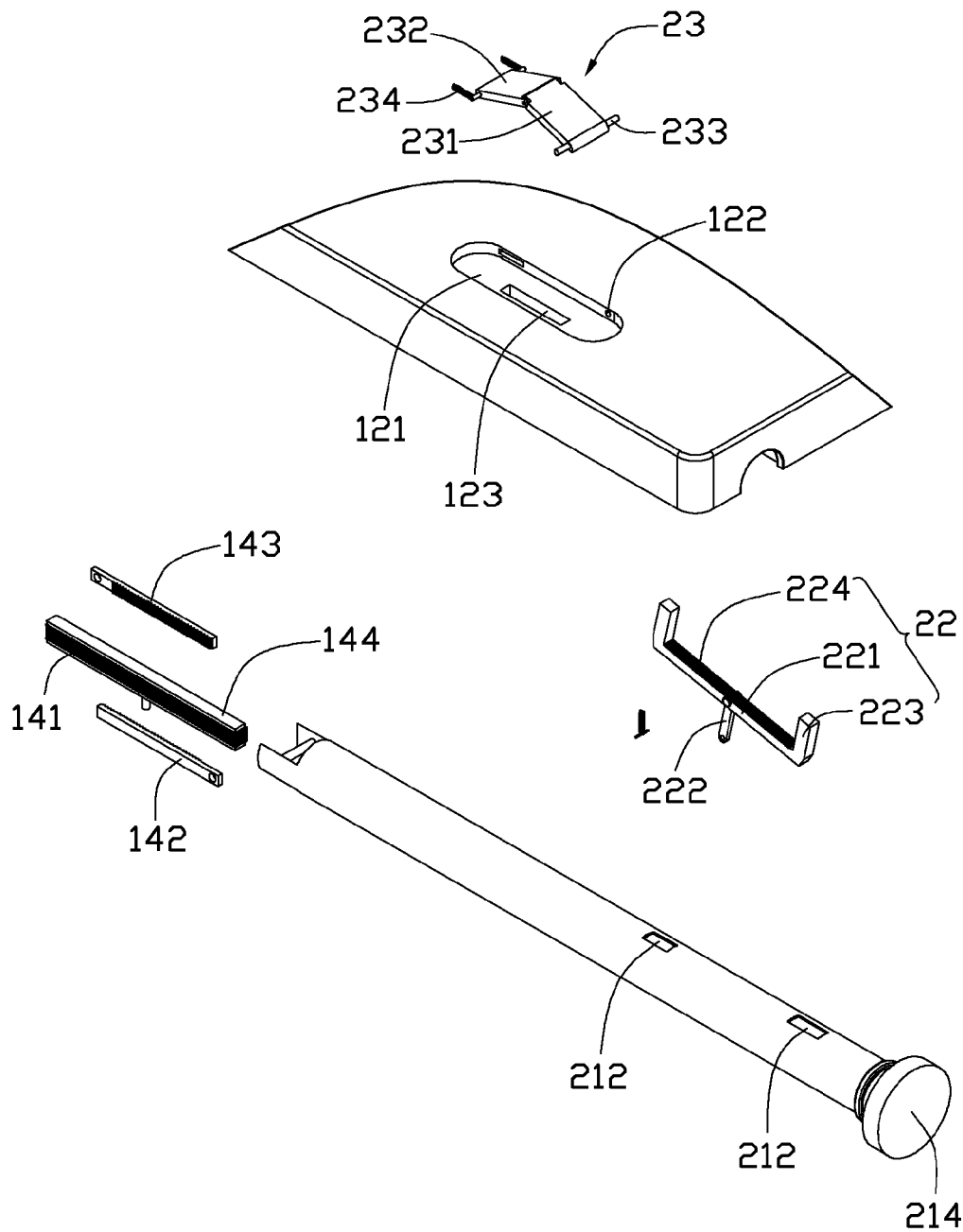
FIG. 3 is an enlarged partial view of FIG. 2.

Referring to FIG. 3, the bottom of the lower cover 12 defines two slots 121 adjacent to the two ends of the notch 13 respectively, and two through holes 123 thereby communicating the slots 121 with the notch 13. Two furrows 122 are defined in the side walls of each of the two slots 121 and facing each other.

Figure 4:
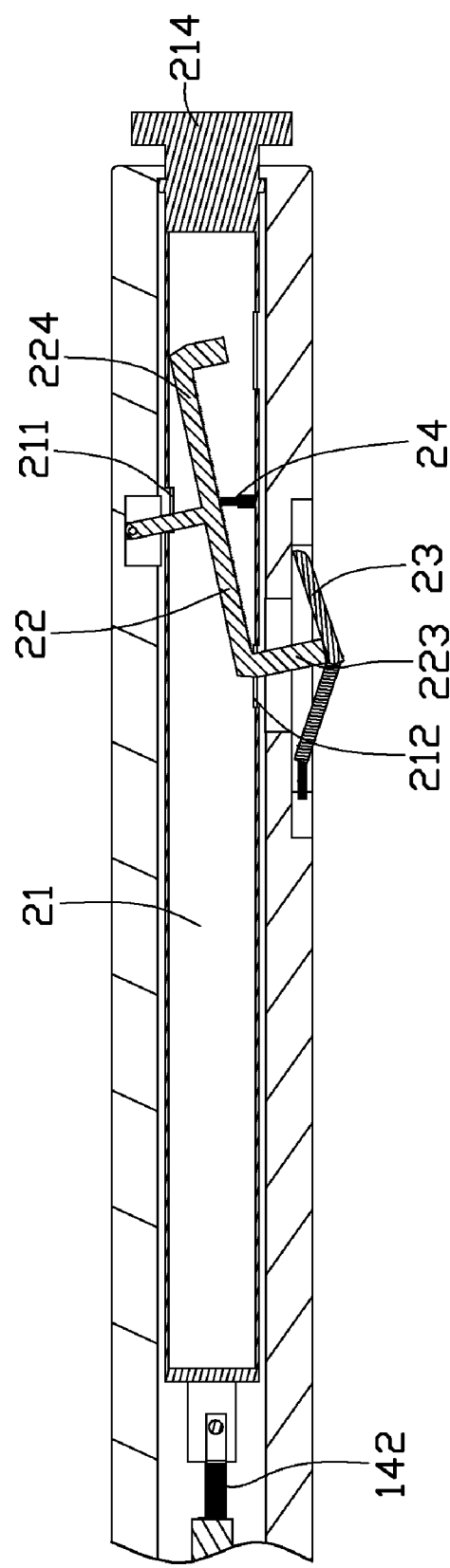
FIG. 4 is a partial, cross-sectional view taken along line IV-IV of FIG. 1, with the keyboard propped up by support.

The support 20 includes two shafts 21, a transmission portion 14, two driving portions 22, two brackets 23 and two elastic pieces 24. Each of the shafts 21 is slidably received in the notch 13. Buttons 214 are mounted on each of the free ends of the shafts 21 and positioned out of the notch 13 for receiving user's manipulations. Referring to FIG. 4, each of the shafts 21 is hollow and defines a first radial through hole 211, a second radial through hole 212. The two shafts 21 are movably connected to each other by the transmission portion 14.

Referring also to FIG. 3, the transmission portion 14 includes a plate 144, a toothed belt 141, a first rack 142 and a second rack 143. The toothed belt 141 is mounted around the plate 144 and is rotatable relative to the plate 144. The first rack 142 and the second rack 143 are engaged with two opposite sides of the toothed belt 141 respectively, and the first rack 142 and the second rack 143 are respectively fixed to one end of each of the two shafts 21 opposite to the corresponding button 214. When one of the two shafts 21 is driven to slide along the notch 13, it drives one of the first rack 142 or the second rack 143, the toothed belt 141, the other rack that in turn causes the other one of the two shafts 21 to move in turn. Thus, a user needs to operate only one shaft 21 to adjust the support 20.

Each of the two driving portions 22 is received in the hollow of one of the two shafts 21. Each of the driving portions 22 includes a pivot arm 222, a truss 221 and two mandrels 223. The two mandrels 223 vertically extend from each of the two ends of the truss 221 respectively. The pivot arm 222 is fixed to the middle portion of the truss 221 opposite to the two mandrels 223. The free end of the pivot arm 222 extends out of the corresponding shaft 21 through the first radial through hole 211 and is pivotally fixed in the main body 10. A surface of the truss 221 opposite to the pivot arm 222 forms a plurality of stopper slots 224. The plurality of stopper slots 224 is vertical to the two shafts 21. One of the two mandrels 223 extends out of the shaft 21 through the second radial through hole 212.

Each of the two brackets 23 is slidably received in one of the two slots 121. Each of the two brackets 23 includes a first plate 231 and a second plate 232 rotatably connected with one end of each other. The free end of the first plate 231 forms two shafts 233 fixed in the furrows 122 of the main body 10. The free end of the second plate 232 is connected with a restoration spring 234, and the other end of the restoration spring 234 is fixed in the furrows 122 of the main body 10 for pulling the second plate 232 and the first plate 231 connected with the second plate 232 into the slot 121.

Referring to FIG. 4, each of the two elastic pieces 24 is also accommodated in the hollow of one of the two shafts 21. One end of each of the two elastic pieces 24 is fixed in the inner wall of one of the two shafts 21, the other end of the elastic piece 24 resists against the stopper slots 224 of the driving portion 22. The elastic piece 24 is capable of sliding relatively along the stopper slots 224 to adjust the angular position of the driving portions 22.

When one of the two shafts 21 is pulled out from the main body 10, the elastic piece 24 slides from one to another of the stopper slots 224 towards the buttons 214 according to the elasticity of the elastic piece 24 for propping up the truss 221. The one far from the buttons 214 of the two mandrels 223 extends through the second radial through hole 212 and the through hole 123 to resist one of the two brackets 23. The free ends of the two brackets 23 slide in opposite directions, the two brackets 23 fold to form a V shape to certain degree to lift up the rear side of the keyboard 100. As a result, the angular position of the keyboard 100 is adjusted. By pulling the shafts 21 to different positions, the keyboard 100 can be adjusted to a plurality of different angular positions to correspond to the users needs.

Figure 5:
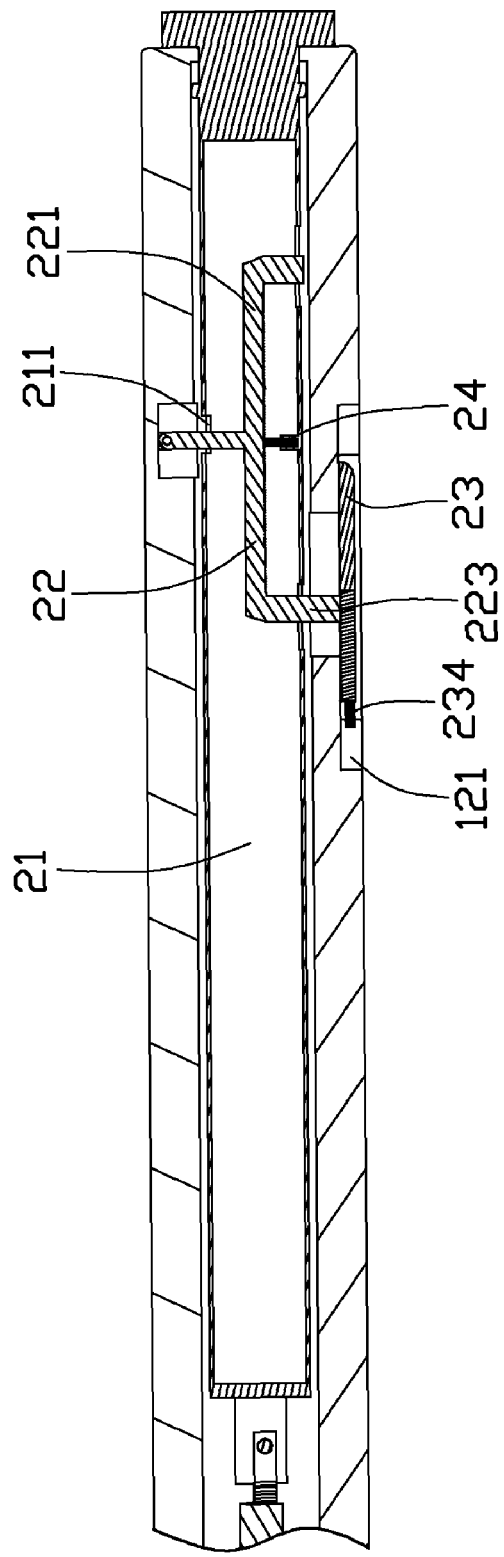
FIG. 5 is similar to FIG. 4, but with the keyboard not propped up by the support.

Referring also to FIG. 5, when one of the two shafts 21 is pushed into the main body 10, the corresponding elastic piece 24 slides towards the middle portion of the truss 221. Accordingly, the one farthest from the buttons 214 of the two mandrels 223 is lifted and releases the two brackets 23, the two brackets 23 are unfolded and received in the slots 121 because the two restoration springs 234 pull the second plates 232 into the slots 121. As a result, the rear side of the keyboard 100 is let down correspondingly.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A keyboard comprising:
a main body configured for receiving keys, wherein the main body defines two slots in a bottom, and two furrows are defined in the side walls of each of the two slots and facing each other;
a support accommodated in the main body, comprising two brackets received in the slots, two shafts, two driving portions, and two elastic pieces, wherein each of the brackets comprises a first plate and a second plate rotatably connecting with each other; each of the shafts is hollow and is slidable relative to the main body; each of the driving portion is rotatably received in one of the two shafts; one end of each of the elastic pieces is fixed to an inner wall of the corresponding shaft, the other end supports the corresponding one of the two driving portions; and when one of the two shafts is moved, two elastic pieces fixed to the shafts move along with the shafts to resist against the two driving portions respectively, the two driving portions are pushed out of the two shafts to prop up the brackets.

2. The keyboard of claim 1, wherein each of the two driving portions comprises a pivot arm, a truss and two mandrels, the two mandrels vertically extend from each of the two ends of the truss respectively; the pivot arm is fixed to the middle portion of the truss opposite to the two mandrels; the free end of the pivot arm extends out of the corresponding shaft is pivotally fixed in the main body.

3. The keyboard of claim 2, wherein each of the two shafts defines a first radial through hole and a second radial through hole, one end of the pivot arm extends though the first radial hole to be fixed in the main body, and one of the two mandrels extends though the second radial hole to prop up the bracket.

4. The keyboard of claim 2, wherein a surface of the truss opposite to the pivot arm forms a plurality of stopper slots, the stopper slots are vertical to the two shafts, one end of each of the two elastic pieces is fixed in the inner wall of one of the two shafts, the other end of the elastic piece resists the stopper slots.

5. The keyboard of claim 1, wherein a free end of the second plate is connected with a restoration spring, and the other end of the restoration spring is fixed in the furrows of the main body for pulling the second plate and the first plate connected with the second plate into the slot.

6. The keyboard of claim 1, wherein the main body comprises an upper cover and a lower cover coupled with the upper cover, the upper cover and the lower cover cooperate to form a notch for receiving the two shafts.

7. The keyboard of claim 1, wherein the support further comprises a transmission portion, the two shafts are slidably connected by the transmission portion.

8. The keyboard of claim 7, wherein the transmission portion comprises a plate, a toothed belt mounted around the plate and rotatable relative to the plate, a first rack and a second rack, the first rack and the second rack are engaged with two opposite sides of the toothed belt respectively, and the first rack and the second rack are respectively fixed to one of the opposite ends of the two shafts.

* * * * *